US010057651B1

(12) United States Patent
Singh et al.

(10) Patent No.: US 10,057,651 B1
(45) Date of Patent: Aug. 21, 2018

(54) VIDEO CLIP CREATION USING SOCIAL MEDIA

(71) Applicant: Twitter, Inc., San Francisco, CA (US)

(72) Inventors: Baljeet Singh, San Francisco, CA (US); Michael Folgner, San Francisco, CA (US); David Regan, San Francisco, CA (US); Noah Vihinen, San Francisco, CA (US); Tom Woolway, San Francisco, CA (US)

(73) Assignee: TWITTER, INC., San Francisco, CA (US)

( * ) Notice: Subject to any disclaimer, the term of this patent is extended or adjusted under 35 U.S.C. 154(b) by 0 days.

(21) Appl. No.: 14/874,859

(22) Filed: Oct. 5, 2015

(51) Int. Cl.
| | |
|---|---|
| *H04N 21/4788* | (2011.01) |
| *G11B 27/10* | (2006.01) |
| *G11B 27/031* | (2006.01) |
| *H04N 21/234* | (2011.01) |
| *H04N 21/2343* | (2011.01) |
| *H04N 21/845* | (2011.01) |
| *H04N 21/44* | (2011.01) |
| *H04N 21/81* | (2011.01) |
| *H04N 21/488* | (2011.01) |
| *H04N 21/439* | (2011.01) |

(52) U.S. Cl.
CPC ....... *H04N 21/4788* (2013.01); *G11B 27/031* (2013.01); *G11B 27/10* (2013.01); *H04N 21/23424* (2013.01); *H04N 21/234345* (2013.01); *H04N 21/4394* (2013.01); *H04N 21/44008* (2013.01); *H04N 21/4888* (2013.01); *H04N 21/812* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 9,699,523 | B1 * | 7/2017 | Cronin | ............... H04N 21/8549 |
| 2006/0156374 | A1 * | 7/2006 | Hu | ......................... H04N 7/163 |
| | | | | 725/135 |
| 2007/0041706 | A1 * | 2/2007 | Gunatilake | ............ G11B 27/10 |
| | | | | 386/241 |
| 2009/0292526 | A1 * | 11/2009 | Harari | ................. G06F 17/2765 |
| | | | | 704/9 |
| 2011/0041080 | A1 * | 2/2011 | Fleischman | ............ G06Q 30/02 |
| | | | | 715/751 |

(Continued)

*Primary Examiner* — Alexander Q Huerta
(74) *Attorney, Agent, or Firm* — Brake Hughes Bellermann LLP

(57) ABSTRACT

According to an aspect, a system for implementing a video clip service may include a video editor configured to receive a broadcast media stream and obtain a volume of social media engagements of a social media platform. The social media engagements include user engagements on the social media platform about the broadcast stream. The video editor may include a correlator configured to correlate the volume of social media engagements with a timeline of the broadcast media stream, a moment detector configured to detect one or more segments of the broadcast media stream using the volume of social media engagements, and a clip creator configured to automatically create a video clip with the one or more segments. The system may also include a video surfacer configured to provide the video clip for inclusion in a content stream of one or more users of the social media platform.

19 Claims, 8 Drawing Sheets

(56) References Cited

U.S. PATENT DOCUMENTS

| | | | |
|---|---|---|---|
| 2011/0231887 A1 | 9/2011 | West et al. | |
| 2012/0066059 A1 | 3/2012 | Berger et al. | |
| 2012/0079020 A1* | 3/2012 | Park | H04L 51/046 709/204 |
| 2012/0296920 A1* | 11/2012 | Sahni | H04L 67/22 707/749 |
| 2012/0317218 A1* | 12/2012 | Anderson | H04N 21/4786 709/206 |
| 2012/0324491 A1* | 12/2012 | Bathiche | H04H 60/33 725/10 |
| 2013/0007787 A1* | 1/2013 | John | H04N 21/42203 725/10 |
| 2013/0041808 A1* | 2/2013 | Pham | H04L 65/1083 705/39 |
| 2013/0124999 A1* | 5/2013 | Agnoli | G11B 27/031 715/723 |
| 2013/0160051 A1* | 6/2013 | Armstrong | H04N 21/454 725/34 |
| 2013/0198204 A1* | 8/2013 | Williams | G06F 17/30864 707/748 |
| 2013/0297694 A1* | 11/2013 | Ghosh | H04L 67/02 709/204 |
| 2013/0326575 A1* | 12/2013 | Robillard | G11B 27/034 725/116 |
| 2014/0096162 A1* | 4/2014 | Casey | H04N 21/233 725/61 |
| 2014/0201227 A1* | 7/2014 | Hamilton-Dick | G06F 17/30867 707/758 |
| 2014/0237510 A1* | 8/2014 | Phillips | H04N 21/4622 725/34 |
| 2015/0020096 A1* | 1/2015 | Walker | G06T 11/206 725/34 |
| 2015/0185965 A1 | 7/2015 | Belliveau et al. | |
| 2016/0066042 A1* | 3/2016 | Dimov | H04N 21/4667 725/34 |
| 2016/0105734 A1* | 4/2016 | Packard | H04N 21/25841 725/32 |
| 2017/0366828 A1* | 12/2017 | Burkitt | H04N 21/23424 |

* cited by examiner

VIDEO CLIP CREATION USING SOCIAL MEDIA

BACKGROUND

Social media has become a growing part of social life. Social media users can post blogs, photos, comments, messages, locations, feelings, and videos using one or more social media platforms. Often, social media users receive and share videos that are snippets of a larger broadcast (e.g., highlights of a sporting event). However, the creation of video clips is often a time consuming process. For instance, while watching a broadcast, a video editor may have to determine which part of the broadcast is interesting, which portions to cut, and how to edit the video clip in order to create a quality video clip.

SUMMARY

According to an aspect, a system for implementing a video clip service may include at least one computer processor, and a video editor executing on the at least one computer processor and configured to receive a broadcast media stream and obtain a volume of social media engagements of a social media platform. The social media engagements include user engagements on the social media platform about the broadcast stream. The video editor may include a correlator configured to correlate the volume of social media engagements with a timeline of the broadcast media stream, a moment detector configured to detect one or more segments of the broadcast media stream using one or more signals, where the one or more signals include the volume of social media engagements, and a clip creator configured to automatically create a video clip with the one or more segments. The system may also include a video surfacer executing on the at least one computer processor and configured to provide the video clip for inclusion in a content stream of one or more users of the social media platform.

In some examples, the system may include one or more of the following features (or any combination thereof). The video editor may be configured to obtain the volume of social media engagements using a set of keywords. The set of keywords may include a first group of keywords and a second group of keywords. The moment detector may be configured to detect a first segment of the broadcast media stream based on volume of social media engagements corresponding to the first group of keywords and detect a second segment of the broadcast media stream based on volume of social media engagements corresponding to the second group of keywords. The clip creator may be configured to create one or more video clips having the first segment and the second segment. The moment detector may be configured to obtain a plurality of segments, where each segment of the plurality of segments is a different portion of the broadcast media stream, and the clip creator is configured to create the video clip by arranging the plurality of segments according to an order. The plurality of segments may include a first segment and a second segment, where the second segment is separated by a temporal distance from the first segment on the timeline of the broadcast media stream. The order may be a temporal order. The order may be an increasing or decreasing rate of the volume of the social media engagements. The system may further include a video analyzer executing on the at least one computer processor and configured to analyze a video component of the broadcast media stream, where the correlator is configured to correlate output of the video analyzer with the timeline of the broadcast media stream and the moment detector is configured to detect the one or more segments of the broadcast media stream using the volume of social engagements and the output of the video analyzer. The video analyzer may include an object recognition unit configured to detect objects or persons in the video component. The video analyzer may include a scene detection unit configured to determine a change in scenes of the video component. The system may include an audio analyzer executing on the at least one computer processor and configured to analyze an audio component of the broadcast media stream, where the correlator is configured to correlate output of the audio analyzer with the timeline of the broadcast media stream and the moment detector is configured to detect the one or more segments of the broadcast media stream using the volume of social engagements and the output of the audio analyzer. The audio analyzer may include a text-to-speech unit configured to convert speech of the audio component into text. The system may include a social media analyzer executing on the at least one computer processor and configured to analyze the social media engagements about the broadcast media stream, where the moment detector is configured to detect the one or more segments of the broadcast media stream using the volume of social engagements and output of the social media analyzer. The social media analyzer may include a sentiment analysis unit configured to determine sentiment of the social media engagements. In some examples, the system may include a content promoter executing on the at least one computer processor and configured to determine one or more video clips for an advertiser. The video surfacer may be configured to determine that a message of a user is related to the broadcast media stream, and provide the video clip to the user. The clip creator may be configured to determine a start point and an end point of the video clip based on the one or more signals.

According to an aspect, a non-transitory computer-readable storage medium comprising executable instructions that when executed by at least one computer processor are configured to receive a broadcast media stream, obtain a volume of social media engagements of a social media platform, where the social media engagements include user engagements on the social media platform about the broadcast media stream, detect one or more segments of the broadcast media stream using one or more signals, where the one or more signals include the volume of social media engagements, automatically create a video clip with the one or more segments, and provide the video clip for inclusion in a content stream of one or more users of the social media platform.

In some examples, the non-transitory computer-readable storage medium may include one or more of any of the above or below features (or any combination thereof). The one or more signals may include the volume of social media engagements, external data received from an external source, output of a video analyzer, output of an audio analyzer, and output from a social media analyzer. The executable instructions may include instructions to correlate the volume of social media engagements with a timeline of the broadcast media stream, provide a display of the broadcast media stream, and provide a visualization of the volume of the social media engagements against the display of the broadcast media stream. The visualization may include a histogram. The volume of social media engagements may be obtained using a set of keywords. Each segment may be a different portion of the broadcast media stream, and the video clip may be automatically created by arranging segments according to an order. The executable instructions may include instructions to determine a start point and end point for the video clip.

According to an aspect, a method for automatic clip creation may include receiving, by at least one computer processor, a broadcast media stream from a video source, obtaining, by the at least one computer processor, a volume of social media engagements of a social media platform, where the social media engagements include user engagements on the social media platform about the broadcast media stream, detecting, by the at least one computer processor, one or more segments of the broadcast media stream using a combination of signals, where the combination of signals are two or more of the volume of social media engagements, external data received from an external source, output of a video analyzer, output of an audio analyzer, and output from a social media analyzer, automatically creating, by the at least one computer processor, a video clip with the one or more segments, and providing, by the at least one computer processor, the video clip for inclusion in a content stream of one or more users of the social media platform.

In some examples, the method may include one or more of any of the above or below features (or any combination thereof). The detecting one or more segments of the broadcast media stream may include detecting a segment during a course of the broadcast media stream using a scoring algorithm inputted with the combination of signals. The method may include providing, by the at least one computer processor, a display of the broadcast media stream, and providing, by the at least one computer processor, a visualization of the volume of the social media engagements against the display of the broadcast media stream. The visualization may include a sound wave. The volume of social media engagements may be obtained using a set of keywords. The method may further include determining, by the at least one computer processor, a start point and end point for the video clip based on the combination of signals.

DETAILED DESCRIPTION

Techniques, methods, and systems are disclosed herein for implementing a cloud video clip service that receives a broadcast media stream (e.g., a live sporting event), obtains a volume of social media engagements (e.g., messages per minute) concerning that broadcast media stream, correlates the social media volume with a timeline of the broadcast media stream, provides a visualization of the changing social media volume against the display of the broadcast media stream, automatically creates or suggests one or more video clips using the social media volume, and/or surfaces those video clips to the social media platform to particular users, a group of users, or tabs or sections of the social media platform. In addition, the cloud video clip service can correlate other types of data such as audio data, closed captioned data, third party data, sentiment analysis or other real-time intelligence to the timeline of the broadcast media stream in order to understand the importance, relevance, significance, and/or content of different segments of the broadcast stream on multiple levels, which then can be used to automatically create video clips and then share those video clips in an intelligent manner.

The cloud video clip service can determine or assist with decisions typically made by a video editor to more accurately determine the start and end points of a video clip by detecting a relevant event in the broadcast media stream from the rate of social media volume, information about the timing or the event itself from the closed captioned data (e.g., when an announcer mentions a certain player or action), and/or information on what frame to start and stop the video clip from a video analysis that detects certain scene changes (e.g., when it was cut to a close-up camera or a far view camera). As a result, the cloud video clip service can automatically determine highly relevant, quality video clips from broadcast media streams using its social media volume in conjunction with other types of data or analysis with minimal human intervention.

Figure 1:
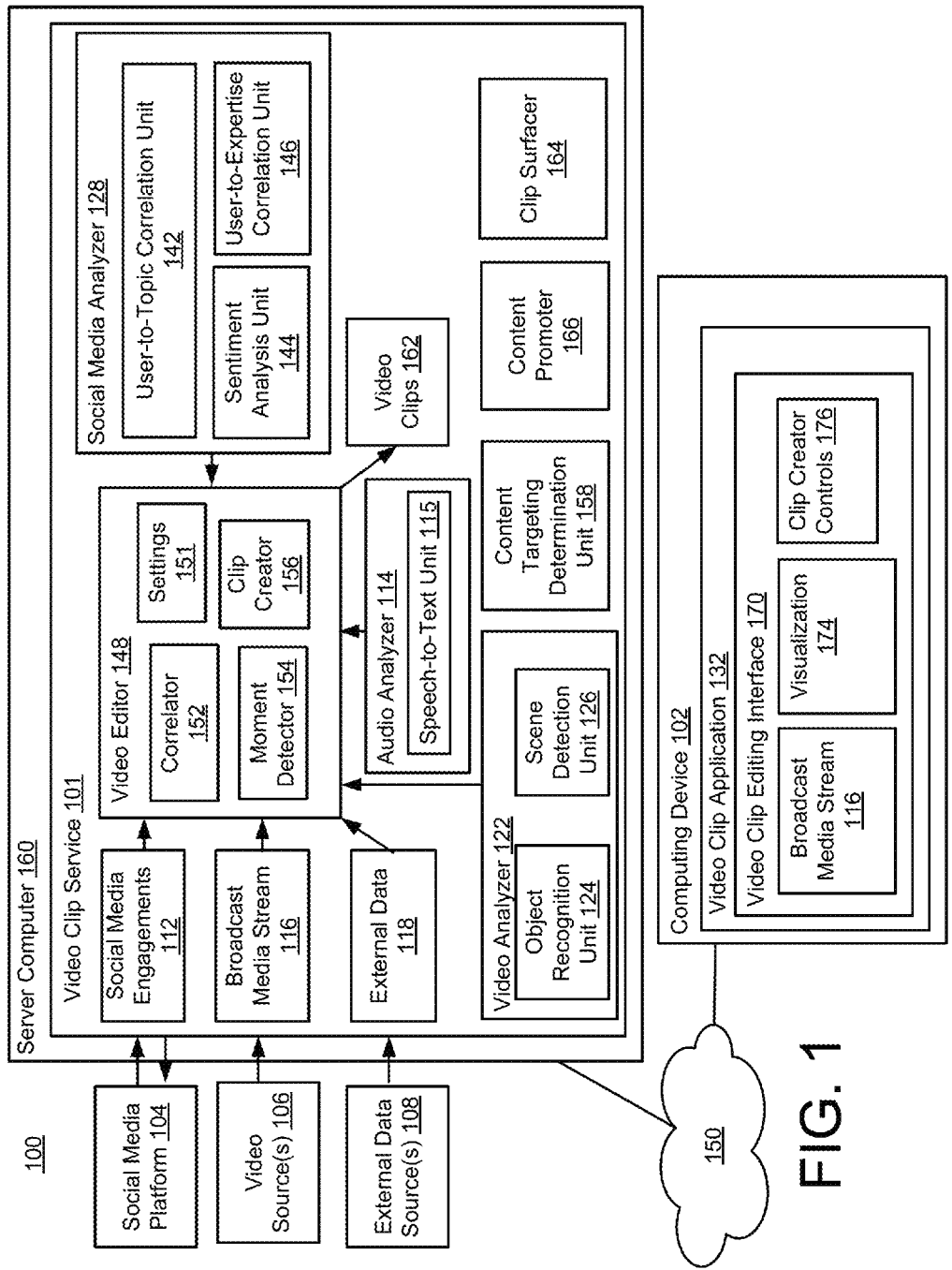
FIG. 1 is a schematic diagram of a system configured to support a video clip service that automatically creates a video clip from a broadcast media stream using a volume of social media engagements according to an implementation.

FIG. 1 is a schematic diagram of a system 100 configured to support a video clip service 101 executing on a server computer 160 and a video clip application 132 executing on a computing device 102. The video clip application 132 may be configured to communicate with the video clip service 101 over a network 150. The video clip application 132 may be a native application executing on an operating system of the computing device 102 or may be a web-based application executing on the server computer 160 (or other server) in conjunction with a browser-based application of the computing device 102.

The video clip application 132 may provide a video clip editing interface 170 that allows a user to interact with the video clip service 101. For example, the video clip editing interface 170 can display information from the video clip service 101 such as a display of a broadcast media stream 116 and a visualization 174 of the social media engagements 112. Also, the video clip editing interface 170 may provide clip creator controls 176 to define or assist with defining various settings, parameters, options, and/or selections for creating one or more video clips 162 from the broadcast media stream 116. Also, the video clip editing interface 170 can provide information about the video clip 162 such as background data, contextual data, the social media metrics associated with the video clip 162, and/or any other information that would assist in learning about the contents of the video clip 162.

The video clip service 101 may be considered a cloud video clip service such that all or most of its main functionalities are executed on the server computer 160. For instance, the computing device 102 may access the video clip service 101 via the network 150 through the use of any type of network connections and/or application programming interfaces (APIs) in a manner that permits the video clip application 132 and the video clip service 101 to communicate with each other. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the server computer 160 may also represent an example of cloud computing. In other examples, the video clip service 101 is not implemented as part of a cloud computing paradigm, but instead is incorporated into the video clip application 132 executing locally on the computing device 102.

The computing device 102 may be a mobile computing device (e.g., a smart phone, a PDA, a tablet, or a laptop computer) or a non-mobile computing device (e.g., a desktop computing device). The computing device 102 also includes various network interface circuitry, such as for example, a mobile network interface through which the computing device 102 can communicate with a cellular network, a Wi-Fi network interface with which the computing device 102 can communicate with a Wi-Fi base station, a Bluetooth network interface with which the computing device 102 can communicate with other Bluetooth devices, and/or an Ethernet connection or other wired connection that enables the computing device 102 to access the network 150. The computing device 102 may include other sensors (not shown), such as, for example, an ambient light sensor, a temperature sensor, an accelerometer, etc.

The video clip service 101 may receive a broadcast media stream 116 from a video source 106. The video source 106 may be a cable network provider or non-cable network provider. The video source 106 may be a video streaming provider. The video source 106 may be a broadcast media provider. In some examples, the broadcast media stream 116 is a live broadcast media stream 116. In some examples, the broadcast media stream 116 is a previously-recorded video stream. Generally, the broadcast media stream 116 may be any type of media stream that is (at some point) broadcasted to a number of viewers. The broadcast media stream 116 may include a video component. The broadcast media stream 116 may include an audio component. In some examples, the broadcast media stream 116 may include both the video component and the audio component. The video clip service 101 may receive the broadcast media stream 116 from the video source 106 over a communication network (e.g., antenna, cable, satellite, internet, etc.).

The video clip service 101 may receive one or more social media metrics indicating a volume of social media engagements 112 associated with the broadcast media stream 116 from a social media platform 104 in real-time or near real-time. The social media platform 104 may be any type of computer-mediated system that allows people to create, share, or exchange information, ideas, pictures/videos in virtual communities or networks. The social media engagements 112 may be information exchanged on the social media platform that relates to the broadcast media stream 116 such as messages, posts, comments, signals of appreciation (e.g., likes) about the broadcast media stream 116. The social media metrics or volume of social media engagements 112 may be the number of social media engagements per a certain unit of time. In some examples, the volume of social media engagements may be the number of messages per minute that relate to the broadcast media stream 116 (e.g., includes one or more keywords that have been identified as being indicative of the broadcast media stream 116).

The video clip service 101 may correlate the volume of social media engagements 112 with a timeline of the broadcast media stream 116. For example, the video clip service 101 may identify related social media engagements 112 from the social media platform 104 using certain keywords, identifiers, tags, hashtags, or other mechanisms that can identify information exchanged on the social media platform 104 (generally referred to as keywords). For instance, the use of keywords permits the video clip service 101 to obtain a sense of the level of engagement with the broadcast media stream 116 (e.g., are there many people interested in this broadcast? Which parts are the most interesting to the viewers?). The video clip service 101 may permit the user to define the relevant keywords, and then the video clip service 101 may derive the social media metrics that contains the relevant keywords, and map this information against the timeline of the broadcast media stream 116. In other examples, the video clip service 101 may automatically determine the relevant keywords based on information about the broadcast media stream 116 (e.g., the title of the broadcast, teams, players, actors, description, etc.) received from the broadcaster or third party services.

The video clip service 101 may overlay the changing volume of social media engagements 112 with the timeline of the broadcast media stream 116 such that the video clip service 101 can determine the level of interest during the course of the broadcast. There may be a spike in the social media engagements 112 for a particular time (or time interval). This spike may be caused by an important event occurring in the broadcast media stream 116, and the video clip service 101 may be able to determine which part of the broadcast media stream 116 corresponds to the spike based on the mapping or correlation of the volume of social media engagements with the timeline of the broadcast media stream 116. As the broadcast media stream 116 is viewed by users of the social media platform 104, the social media engagements 112 with that broadcast media stream 116 may change over time (e.g., increase or decrease over time). If there was an exciting part of the broadcast media stream 116 that garnered a high level of attention on the social media platform 104, the social media engagements 112 may be relatively high for that segment of the broadcast media stream 116. When there is an un-exciting part of the broadcast media stream 116 that garnered a low level of attention on the social media platform 104, the social media engagements 112 may be relatively low for that segment of the broadcast media stream 116. The video clip service 101 uses the social media engagements 112 as an indicator to determine which part of the broadcast media stream 116 is more relevant, interesting, and/or important to the users of the social media platform 104.

The video clip service 101 may visually display how the social media engagements 112 change over time as the broadcast media stream 116 is being viewed by the users of the social media platform 104. For example, the video clip service 101 may provide, over the network 150, a display of the broadcast media stream 116 in the video clip editing interface 170 of the video clip application 132. Also, the video clip service 101 may provide a visualization 174 of the volume of the social media engagements 112 in relation to the display of the broadcast media stream 116 so that a user can visually view the amount of social media interest for various parts of the broadcast media stream 116. The visualization 174 may be a sound wave, histogram, or any type of visual indicator indicating a level of social media engagements 112 with the broadcast media stream 116. For example, the visual indicator may change based on the level of social media engagements 112 to reflect the level of attention on the social media platform 104. In one example, the sound wave may be larger for parts of the broadcast media stream 116 associated with an increased rate of social media engagements 112. In some examples, the video clip service 101 is configured to continuously receive the relevant social media engagements 112 from the social media platform 104, and then populate the visualization 174 (and/or show the actual metrics) at intervals such as every 10 seconds, for example.

The video clip service 101 may automatically create or suggest one or more video clips 162 using the volume of the social media engagements 112. For example, if the social media engagements 112 exceed a threshold level, the video clip service 101 may determine a point (or segment) within the timeline of the broadcast media stream 116 to create a particular video clip 162. The broadcast media stream 116 may be a basketball game, and the video clip service 101 detects a spike in the volume of social media engagements 112 at the time (or shortly after) a game winning shot. Then, the video clip service 101 may estimate the point in the broadcast media stream 116 that includes the game winning shot based on the time associated with the spike in the social media engagements 112. For instance, the spike in social media engagements may have occurred at 5:54 pm, and the video clip service 101 may determine a starting and end point that encompass the time associated with the spike. In some examples, the video clip service 101 may detect the time associated with the spike, and then determine a starting time at a previous time (e.g., 30 seconds before the spike).

A video clip 162 may be a distinct portion of the broadcast media stream 116 such as a 20 second video clip. In some examples, the video clip 162 may be a sequential order of frames that correspond to a certain time interval. In other examples, the video clip 162 may be multiple segments of the broadcast media stream 116. In some examples, the multiple segments may be in chronological, continuous order (e.g., one segment follows another segment). In other examples, the multiple segments may be chronological, but not continuous (e.g., one of them relates to a point in the broadcast at a later time than the other one). In other examples, the multiple segments are not chronologic or continuous.

The video clip service 101 may assemble a plurality of segments into a single video clip 162. The video clip service 101 may determine an ordering of the segments. For example, the video clip service 101 may determine that the plurality of segments be arranged in a temporal order. In other examples, the video clip service 101 may determine that the plurality of segments be arranged in the order of their social media volume (e.g., highest engagement to lowest engagement, or vice versa). For example, the video clip service 101 may create a highlight reel that depicts certain moments of increasing engagement (which may be not temporal).

The video clip service 101 can correlate other types of data such as external data 118 from one or more external data sources 108, output from a video analyzer 122 that analyzes the video component of the broadcast media stream 116, output from an audio analyzer 114 that analyzes the audio component of the broadcast media stream 116, output from a social media analyzer 128 that analyzes the social media engagements 112 about the broadcast media stream 116 to the timeline of the broadcast media stream 116 in order to understand the importance, relevance, significance, and/or content of different segments of the broadcast media stream 116 on multiple levels, which then can be used to automatically create the video clips 162 and surface those video clips 162 to users of the social media platform 104.

The video clip service 101 can determine or assist with decisions typically made by a video editor to more accurately determine the starting and ending points of the video clip 162 such as detecting an important event in the broadcast media stream 116 from the rate of which the social media volume increases, learning information about the timing or the event itself from the output of the audio analyzer 114, and learning what frame to start and stop the video clip 162 from the output of the video analyzer 122. As a result, the video clip service 101 can automatically determine highly relevant, quality video clips 162 from the broadcast media stream 116 using the social media volume in conjunction with other types of data or analysis with minimal human intervention.

Also, the video clip service 101 may be configured to analyze multiple broadcast media streams 116 at or around the same time. The video clip service 101 may provide a programming calendar that identifies the timing of the broadcasts. The video clip service 101 may receive indications on which broadcast media stream 116 to be used as part of the video clip service 101. For example, the user of the video clip service 101 may activate some or all of the functionalities of the video clip service 101 for one or more than one broadcast media stream 116. As such, a user of the video clip service 101 may be able to obtain quality video clips 162 across a number of broadcast media streams 116 that are being broadcasted at the same time (for at least a period of time). As a result, the amount of human resources typically required to monitor and manually create the video clips 162 can be substantially reduced. Also, the video clip service 101 may store the results of the video clip service 101 in conjunction with each broadcast media stream 116 so that a user can review and edit them at a later point.

The video clip service 101 may include a video editor 148 configured to create one or more video clips 162. A video clip 162 may be a portion of the broadcast media stream 116, or include two or more sequential or non-sequential portions of the broadcast media stream 116. The video editor 148 may be configured to perform video editing of digital video sequences of the broadcast media stream 116 to create one or more video clips 162 from the broadcast media stream 116. In some examples, the video editor 148 may be configured to trim, splice, cut, and/or arrange one or more segments or clips across a timeline. Also, the video editor 148 may perform other types of video editing features such as color manipulation, titling and visual effects, and may include tools for editing and mixing audio synchronized with the video image sequence. The video editor 148 may be configured to create the video clips 162 with a particular format for distribution on the internet, the social media platform 104, or other types of systems or networks. In some examples, the video editor 148 may create a particular video clip 162 in multiple different formats for distribution on two or more different systems.

The video editor 148 may obtain the volume of social media engagements 112 associated with the broadcast media stream 116 based on defined settings 151. The settings 151 may include keywords. The keywords may be terms, phrases, words, hashtags, tags, identifiers, or any information that can identify information exchanged on the social media platform 104. For example, in order to determine which social media engagements 112 are associated with the broadcast media stream 116, the video editor 148 may define keywords that are known to be associated with the broadcast media stream 116. As such, the settings 151 may include a list of keywords that are used to identify the social media engagements 112. Then, the video editor 148 is able to collect the volume of social media engagements 112 from the social media platform 104 that correspond to the keywords. In some examples, the settings 151 may include filters. The filters may include geographical filters (e.g., focus on a particular region of the world or country) or any type of filter that limits the social media engagements 112 to a particular target.

The type of keywords defined in the settings 151 influence the volume of social media engagements 112. For example, one list of keywords may produce different levels of social media engagements 112 than a list having different keywords. The video editor 148 may be capable of creating a first video clip that corresponds to a certain target, and creating a second video clip of the same event that corresponds to a different target. The first video clip may include video footage different than the second video clip because the second video clip used different keywords. In further detail, the settings 151 may include a first list of keywords that identify a basketball game and a certain player (player A), and the settings 151 may include a second list of keywords that identify the same basketball game and a different player (player B). In this example, the video editor 148 may obtain the volume of social media engagements 112 that correspond to the first list of keywords, and correlate this volume against the timeline of the broadcast media stream 116. Further, the video editor 148 may obtain the volume of social media engagements 112 that correspond to the second list of keywords, and correlate this volume against the timeline of the broadcast media stream 116. The video clip service 101 may provide two different visualizations 174 with respect to the broadcast media stream 116. For example, a first visualization may be directed at player A, and the second visualization may be directed at player B. As explained above, a spike in the social media engagements 112 may indicate an important moment. As such, the video editor 148 may be able to automatically create a highlight reel of player A's relevant moments in the basketball game, and automatically create a highlight reel of player B's relevant moments in the basketball game.

The video editor 148 may include a correlator 152 configured to correlate the volume of the social media engagements 112 with the timeline of the broadcast media stream 116. For example, the correlator 152 may map the various levels of social media engagement (e.g., one part of the stream may have a higher social media engagement, another part of the stream may have a lower social media engagement) with the timeline of the broadcast media stream 116. The timeline of the broadcast media stream 116 may be a time interval from a starting time to an ending time. The timeline of the broadcast media stream 116 may be in minutes, seconds, or fraction of seconds. Also, each social media engagement 112 may be associated with a certain time. For example, if the social media engagement 112 is a message posted on the social media platform 104, the time may be the timestamp of when the message was posted. In some examples, the correlator 152 may be able to obtain the total number of messages per minute that is associated with the broadcast media stream 116 (e.g., as defined by the settings 151). Accordingly, as the correlator 152 obtains the newly received social media volume (e.g., 12K messages per minute for 12:55-1:00 pm), the correlator 152 maps this information to the relevant part of the timeline of the broadcast media stream 116. As such, a user of the video clip service 101 may be able to determine which parts of the broadcast media stream 116 received the most amount of attention on the social media platform 104.

The correlator 152 may provide the visualization 174 of the changing social media engagements 112 against the timeline of the broadcast media stream 116. The visualization 174 may be a sound wave, histogram, or visual indicator indicating a level of social media engagements 112 with the broadcast media stream 116. One or more visual characteristics (e.g., color, size, shape, etc.) of the visualization 174 may change based on the level of social media engagements 112 to reflect the level of attention on the social media platform 104. In one example, the sound wave may be larger for parts of the broadcast media stream 116 associated with an increased rate of social media engagements 112.

The video editor 148 may include a moment detector 154 configured to determine a moment of relative importance using the volume of social media engagements 112. For example, if the volume of the social media engagements 112 is above or equal to a threshold amount (spike), the moment detector 154 may detect that a certain moment of importance has occurred. In some examples, if the rate of social media engagements 112 has increased quickly (increased by a certain percentage or amount), the moment detector 154 may be configured to determine that a certain moment of importance has occurred. There may be a spike in the social media engagements 112 for a particular time (or time interval). This spike may be caused by an important event occurring in the broadcast media stream 116, and the moment detector 154 may be able to determine which part of the broadcast media stream 116 corresponds to the spike based on the mapping or correlation of the volume of social media engagements with the timeline of the broadcast media stream 116. At this time, the video editor 148 may suggest that a certain action be taken. In some examples, the video editor 148 may suggest that a video clip 162 be created that corresponds to this moment. In other examples, the video editor 148 may suggest that an action be taken on the social media platform 104 (e.g., sending a message or post about the moment).

The video editor 148 may include a clip creator 156 configured to create a video clip 162 of the detected moment. The video editor 148 may automatically create one or more video clips 162 using the volume of social media engagements 112 as an indicator (e.g., if they exceed a certain rate or amount). In other examples, the clip creator 156 suggests that a video clip 162 be created, and then waits until the user has confirmed to proceed with the video clip 162. The clip creator 156 may determine a start and an end of the video clip 162. The clip creator 156 may determine a start time and an end time for the video clip 162. The clip creator 156 may identify a starting frame and an ending frame for the video clip 162. The clip creator 156 determines or estimates the point in the broadcast media stream 116 that corresponds to the detected moment based on the social media volume correlation, and then determines the start and ending points for the video clip 162 to be a certain temporal distance away from the detected moment (e.g., it starts 20 seconds before the game winning shot, and ends 5 seconds after the game winning shot). In some examples, the clip creator 156 creates the video clip 162 with a pre-defined length (e.g., 30, 40 seconds) with the detected moment somewhere in the middle. In some examples, the user can adjust the clip length.

The video editor 148 (e.g., the moment detector 154, the clip creator 156) can enhance the detection of important events and the creation of video clips 162 by incorporating other data sources such as the external data 118, the video analyzer 122, the audio analyzer 114, and the social media analyzer 128. For example, these components may be used in conjunction with the social media engagements 112 in order to understand the importance, relevance, or significance of different segments of the broadcast media stream 116. In other words, the mapping, identification, and creation of the video clips 162 may be enhanced with one or more other signals in addition to the social media engagements 112.

The video clip service 101 may connect to one or more external data sources 108 to obtain further information (e.g., the external data 118) about the underlying event captured by the broadcast media stream 116. The external data 118 may be any type of information that can provide indications as to the importance of events, the timing events, and/or information about the event itself. In some examples, the external data 118 may be score (or scoreboard information) about broadcasted sporting events. This scoring data may indicate that a particular relevant event has occurred (e.g., a touchdown has been scored), and the time associated with this touchdown. The moment detector 154 and/or the clip creator 156 may use this external data 118 to determine which point in the timeline of the broadcast media stream 116 is relevant.

The video analyzer 122 may be configured to analyze the video component of the broadcast media stream 116 to obtain information helpful for automatically creating the video clips 162. For example, the video analyzer 122 may analyze the video component of the broadcast media stream 116 to obtain information that can assist with identifying the broadcast media stream 116, the nature of the broadcast media stream 116, the underlying events or objects (including persons) captured by the broadcast media stream 116, and/or the starting and ending points for the video clip 162.

The video analyzer 122 may include an object recognition unit 124 configured to perform object recognition to recognize people and/or objects in the broadcast media stream 116. The object recognition unit 124 may use any type of facial recognition techniques such as identifying facial features by extracting landmarks or features from an image of the subject's face. The object recognition unit 124 may include two-dimensional or three-dimensional facial recognition. Also, the object recognition unit 124 may use any type of object recognition techniques to identify objects in the frames of the video such as edge matching, divide-and-conquer search, greyscale matching, gradient matching, and/or histograms, etc. The object recognition unit 124 may employ these techniques to identify certain objects such as buildings or other landmarks. As such, the object recognition unit 124 may detect the number of people in the broadcast media stream 116, and/or detect people in the broadcast media stream 116. The video editor 148 may use the output of the object recognition unit 124 to identify certain people (e.g., famous people), a large number of people (e.g., signifying a relevant event), the timing of when objects occur (e.g., the basketball starts moving on the court), and other types of information derived from a video analysis in order to detect certain relevant moments and/or the start and end of the video clip 162.

The video analyzer 122 may include a scene detection unit 126 configured to detect a change in the scenes of the video component of the broadcast media stream 116, e.g., when certain scenes of the broadcast media stream 116 begin or end. The scene detection unit 126 may determine whether the action has moved to another location, when the broadcaster has changed cameras (e.g., moved from a close-up camera to a further-away camera, or vice versa), and/or the subject matter of the broadcast has changed (e.g., break to commercials, or returned to programming from commercials). The output from the scene detection unit 126 may be utilized by the video editor 148 to assist with determining the start and end of the video clip 162 (e.g., so that it does not extend into a commercial, includes content from a previous scene, includes content that appears out of place).

The audio analyzer 114 may be configured to analyze the audio component of the broadcast media stream 116 to obtain information helpful for automatically creating the video clips 162. For example, the audio analyzer 114 may analyze the audio component of the broadcast media stream 116 to obtain information that can assist with identifying the broadcast media stream 116, the nature of the broadcast media stream 116, the underlying events or objects (including persons) captured by the broadcast media stream 116, and/or the starting and ending points for the video clip 162. The audio analyzer 114 may be configured to obtain closed captioned data associated with the broadcast media stream 116. The audio analyzer 114 may be configured to analyze the closed captioned data for keywords (e.g., keywords identified in the settings 151). In some examples, the audio analyzer 114 may include a speech-to-text unit 115 configured to perform speech recognition on the audio component of the broadcast media stream 116, and analyze the text of the audio component for keywords. The audio analyzer 114 may use any known types of natural language processing to detect keywords from the speech of the audio. The audio analyzer 114 may determine which point in the audio or video component the one or more keywords were spoken so that the video editor 148 may have a more accurate point regarding the detection of that relevant moment and/or the start and end of the video clip 162.

The social media analyzer 128 may be configured to analyze the social media engagements 112 to obtain information that may be helpful for creating and sharing the video clips 162. For example, the social media analyzer 128 may determine whether a particular portion of the broadcast media stream 116 is viewed favorably or un-favorably to the users of the social media platform 104 as a whole or to particular groups of users from a sentiment analysis unit 144, whether a particular portion of the broadcast media stream 116 can be attributed to one or more topics and which users are interested in those topics from user-to-topic correlation unit 142, and whether a particular portion of the broadcast media stream 116 can be attributed to one or more topics or fields and which users are experts in those topics or fields from user-to-expertise correlation unit 146. In some examples, some or all of the parts of the social media analyzer 128 are included within the infrastructure of the social media platform 104 and the video clip service 101 interfaces with the social media platform 104 to obtain any social media metrics regarding user engagement, as any of the social media analysis described herein.

The video editor 148 may use the output of the social media analyzer 128 to determine whether or not to create a video clip 162 for a particular segment of the broadcast media stream 116 that has a high level of social media engagements 112. For example, if the video editor 148 determines that the sentiment associated with the social media engagements 112 is negative (or beyond a certain threshold), the video editor 148 may decide to not create the video clip 162. On the other hand, if the video editor 148 determines that the sentiment associated with the clip's social media engagements 112 is relatively positive, the video editor 148 may decide to create the video clip 162. In other examples, the sentiment analysis unit 144 may indicate that the sentiment associated with the clip's social media engagements 112 is negative for a particular group of users but higher for another group of users, the video editor 148 may proceed with the automatic clip creation of that segment, but direct the surfacing of that video clip 162 to the group of users having the positive sentiment.

The content targeting determination unit 158 may be configured determine a target for providing the video clips 162 based on an output of the social media analyzer 128. For example, the content targeting determination unit 158 may be configured to determine which users may be more interested in the newly created video clip 162 using the user-to-topic correlation unit 142, the sentiment analysis unit 144, and the user-to-expertise correlation unit 146. For example, the sentiment analysis unit 144 may provide an indication on how favorable or unfavorable a video clip 162 will be received by various users or classes or users. As such, the content targeting determination unit 158 may determine the appropriate users or classes or users that the video clip 162 will be most relevant or interesting. Also, the user-to-topic correlation unit 142 may indicate which users are interested in certain topics. As such, if the content targeting determining unit 158 can determine that the video clip 162 relates to a defined topic, the content targeting determining unit 158 can determine the users which are interested in that topic in order to provide them with this video clip 162. Also, the user-to-expertise correlation unit 146 may indicate which users are experts in certain fields or topics. As such, if the content targeting determining unit 158 can determine that the video clip 162 relates to a defined topic or field, the content targeting determining unit 158 can determine the users which are experts in that topic or field in order to provide them with this video clip 162.

The clip surfacer 164 may be configured to disseminate a video clip 162 to users of the social media platform 104. In some examples, the clip surfacer 164 may provide the video clip 162 to a user's social media stream on the social media platform 104. In some examples, the clip surfacer 164 may provide the video clip 162 to other tabs or interfaces of the social media platform 104 such as an area that provides trending data like messages, posts, videos, etc. In some examples, the clip surfacer 164 may provide the video clip 162 to the users or classes of users identified by the content targeting determination unit 158. In some examples, the clip surfacer 164 may provide the actual video clip 162 via a social media message or post sent to the identified users. In other examples, the clip surfacer 164 may provide a link to the video clip via a social media message or post sent to the identified users. In other examples, the clip surfacer 164 may identify or provide the video clip via other interfaces of the social media platform 104 that identifies trends or discoveries in a local, regional, national, or global level.

The clip surfacer 164 may provide the video clip 162 in conjunction with or in response to a message or post provided by a user. For example, the clip surfacer 164 may receive an indication from the social media analyzer 128 that a particular user of the social media platform 104 has shared a message that relates to the created video clip 162. The message may indicate certain information about the event captured by the video clip 162 (e.g., the message contains the same or similar keyword(s) that was used to pull the social media volume about the broadcast). As such, if the clip surfacer 164 recognizes that the user's message relates to the newly created video clip 162 beyond a threshold level of confidence, the clip surfacer 164 may suggest or provide that video clip 162 to that user. In some examples, the clip surfacer 164 may respond with a message suggesting the user view, post, and/or share this video clip 162.

The content promoter 166 may organize and manage created video clips 162 and relevant data that may be candidates for promoting or advertising. For example, an advertiser may execute the video clip application 132 on a computing device 102 to view an interface for viewing a list of video clips 162 relate to the advertiser's brand(s) and relevant data about the video clips 162. In other words, the content promoter 166 may provide, over the network 150, a list of video clips 162 and related data about the video clips 162 that are associated with the advertiser's brand(s). Then, the advertiser may decide to use one or more of the video clips 162 to promote its product, services, or brands. In some examples, the content promoter 166 may allow the advertiser to select and download one or more of the video clips 162. In other examples, the interface also includes clip creator controls 176 in order to edit the video clips 166 as desired by the advertiser. The content promoter 166 may operate in conjunction with the clip surfacer 164 to disseminate the video clip 162 in any manner described above.

Figure 2:
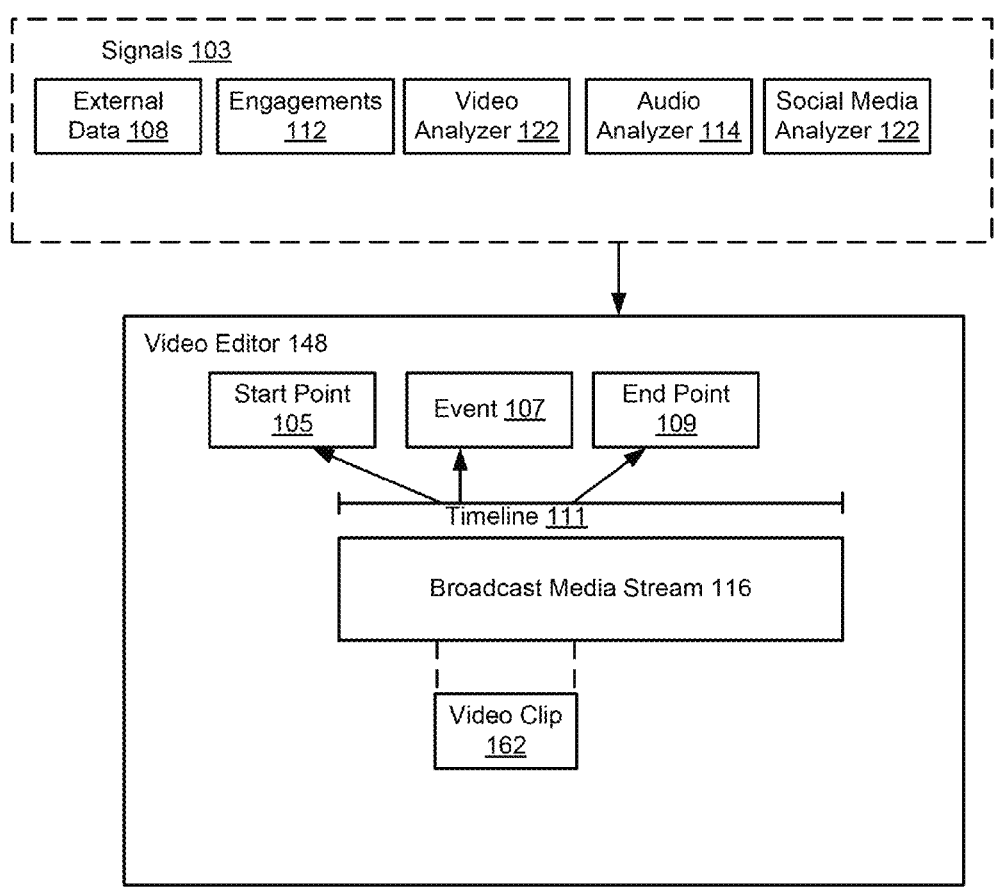
FIG. 2 is a schematic diagram of a video editor of the system of FIG. 1 according to an implementation.

FIG. 2 illustrates a schematic diagram of a perspective of the video editor 148 according to an embodiment. As shown in FIG. 2, the video editor 148 may create a video clip 162 from the broadcast media stream 116 using one or more signals 103. The signals 103 may be from the external data 118, the social media engagements 112, the video analyzer 122, the audio analyzer 114, and the social media analyzer 128. In some examples, the video editor 148 may map the external data 118 (e.g., changes in scores), the level of social media engagements 112 with the broadcast media stream 116, the output of the video analyzer 122 (e.g., scene change detection, object/person detection), output of the audio analyzer 114 (e.g., keywords from text of speech), and output of social media analyzer 128 (e.g., sentiment, interest, expertise of users) to a timeline 111 of the broadcast media stream 116. The timeline 111 may indicate the length of time associated with the broadcast media stream 116 in time units.

By implementing the video editor 148 into a cloud-based paradigm (e.g., like shown in FIG. 1), the video editor 148 is capable of layering the broadcast media stream 116 with multiple signals 103. For example, the video editor 148 can overlay the timeline 111 of the broadcast media stream 116 with social media volume, closed caption data or text from a speech-to-text conversion analysis, external data like score data, and social media analysis information like sentiment analysis, and this mapping can be used to create quality video clips 162 and surface these video clips 162 in an intelligent manner.

Based on one or more of these mappings (or all of them), the video editor 148 may detect an event within the timeline of the broadcast media stream 116 that is considered relevant, interesting, or important to users or classes of users of the social media platform 104. Based on one or more of the signals 103, the video editor 148 may determine or estimate the point in the timeline 111 in which the detected event 107 took place. In some examples, the video editor 148 may determine a temporal distance from the beginning of the broadcast media stream 116 of when the detected event 107 took place (e.g., the event 107 took place 12 minutes and 5 seconds into the broadcast). Also, the video editor 148 may determine information about the event 107 such as what the event 107 is (e.g., a basketball game at the Staples Center), the objects/persons in the video (e.g., which basketball players), key moments (e.g., dunk, winning shot, etc.) based on the signals 103.

Also, the video editor 148 may use the signals 103 as input to a scoring algorithm that determines a score representing a level of confidence that an event of importance has been detected in the broadcast media stream 116, and if that score is above a certain threshold, the video editor 148 may then determine that a particular event 107 has occurred, the timing of the event 107, the length of the event 107, and the information about the event 107. In some examples, the video editor 148 may use a weighted scoring algorithm that applies weights to the various signals 103, and determines the score using the weighted scoring algorithm. Based on one or more of these mappings (or all of them), the video editor 148 may determine a start point 105 and an end point 109 of the video clip 162. The start point 105 and the end point 109 may be the temporal locations in the broadcast media stream 116. In other examples, the start point 105 and the end point 109 may be identified by the starting frame and ending frame.

Figure 3:
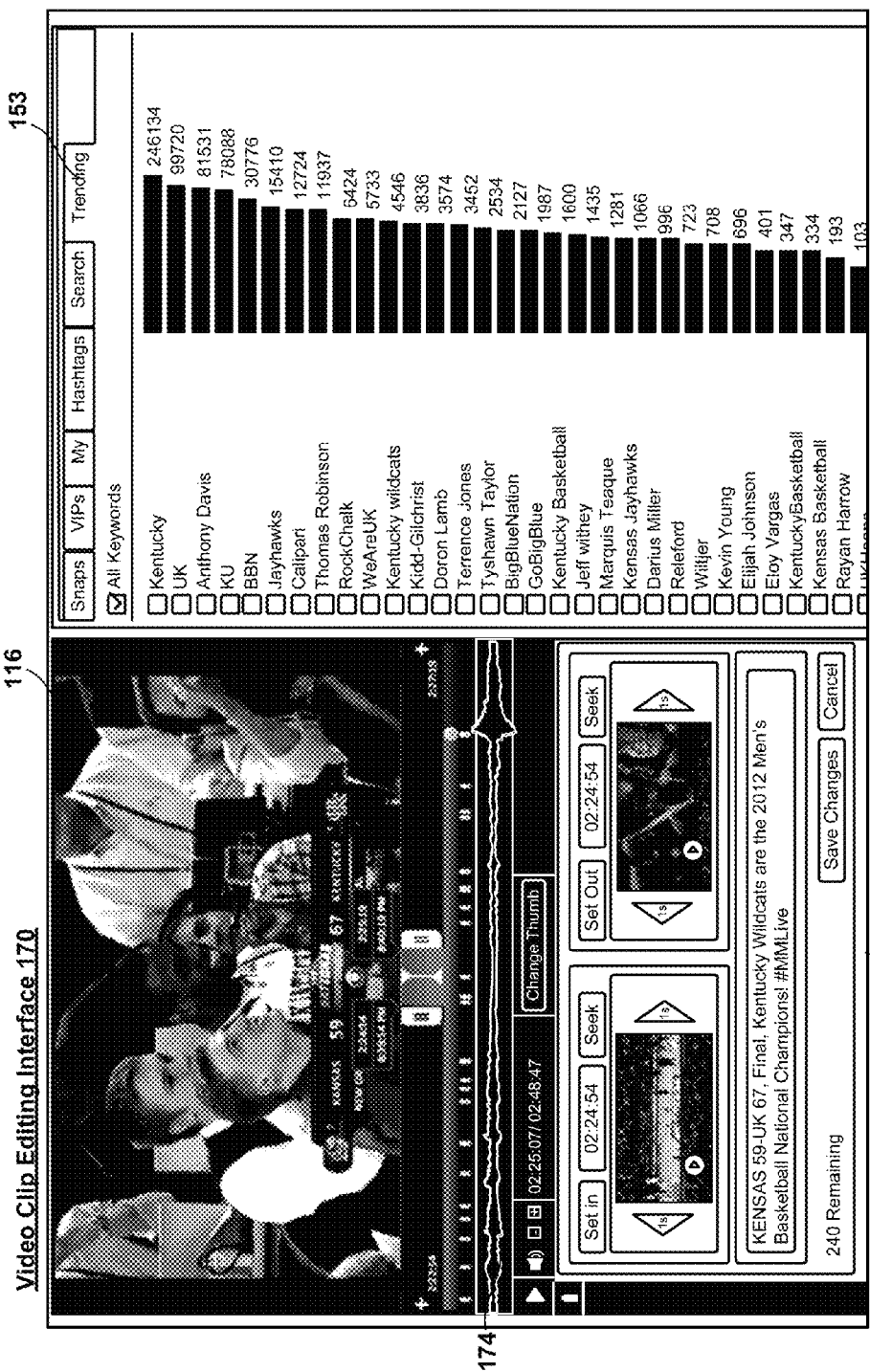
FIG. 3 is a schematic diagram of a video clip editing interface provided by the video clip service of FIG. 1 according to an implementation.

FIG. 3 illustrates a schematic diagram of the video clip editing interface 170 according to an embodiment. The video clip editing interface 170 may include a display of the broadcast media stream 116 and a visualization 174 implemented as a sound wave that illustrates the levels of social media volume defined by certain keywords. Also, the video clip editing interface 170 may allow for the selection of one of a plurality of tabs that can define some of the settings 151 including a tab 153 that shows the mapped keywords along with their social media metric. Also, the video clip editing interface 170 may include the clip creator controls 176 that communicate with the video editor 148 to create the video clip 162 in the manner described above.

The video clip editing interface 170 allows the ability to see a list of keywords and the count of their volume during the event, the ability to select a keyword or multiple keywords (or all keywords) and view the visualization 174 change to reflect the social media volume inclusive of the selected terms, and the ability to freeze (or take a snapshot) of the keywords selected and export the visualization 174.

In some examples, the video clip editing interface 170 may be displaying the visualization 174 around the display of the broadcast media stream 116, and the user may be able to click on the tab 153 to see the keywords that are being tracked for the particular broadcast like a basketball game. In some examples, the clip creator controls 176 provides a selection for the length of the video clip 162 which can have a default value such as 45 seconds. The user may operate the clip creator controls 176 to adjust the value to 50 seconds. In some examples, the clip creator controls 176 permits the user to adjust the keywords being tracked, which will affect the resulting visualization 174.

As the broadcast begins, the user may notice a spike in the social media volume after a key play in the game. In some examples, one or more of the keywords (and corresponding social media volume) are displayed in a different visual characteristic (e.g., color) when exceeding a threshold level. The different color may indicate a high social media volume. In some examples, the video clip service 101 may automatically create the video clip 162 in the manner described above. The video clip service 101 may allow the user to edit the video clip 162. The video clip service 101 may provide an indication to share the video clip 162 on the social media platform 104. In some examples, the video clip service 101 may provide an indication of how many impressions or users it will reach if the video clip 162 is shared on the social media platform 104.

Another key moment in the broadcast may have occurred, and the social media volume may have exceeded a threshold. Upon detection of the social media volume exceeding the threshold amount, the video clip service 101 may suggest a video clip 162 that is 50 seconds prior to the key event by putting an indicator on the timeline 111 of the broadcast media stream 116, and a mark on the clip tray. The video clip service 101 may depict the social volume and the potential impressions. In some examples, the user may dismiss the suggestion or the user may accept the suggestion, and the video clip service 101 may automatically create the video clip 162.

Figure 4:
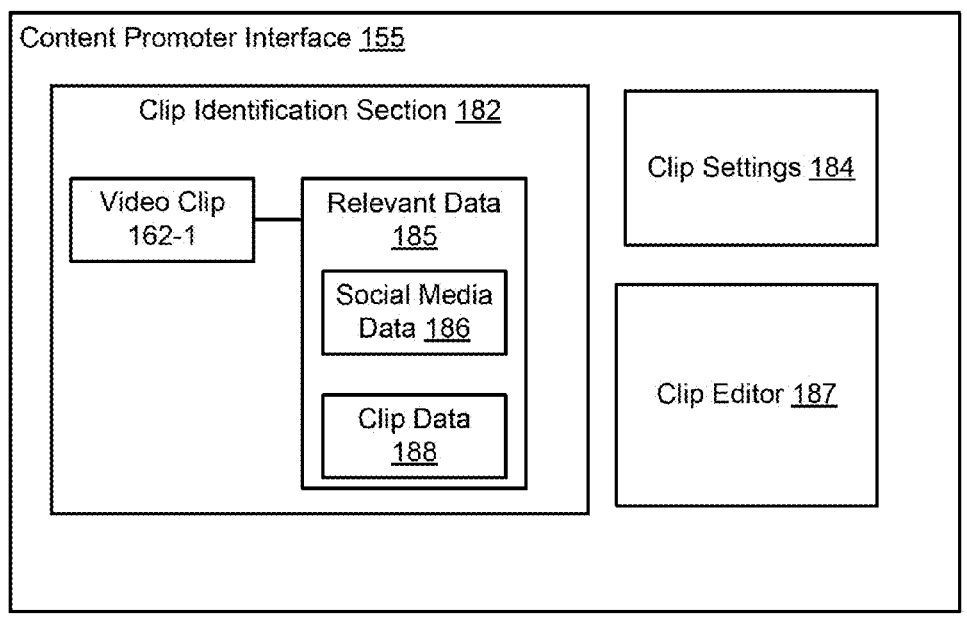
FIG. 4 illustrates a schematic diagram of a content promoter interface provided by the video clip service of FIG. 1 according to an implementation.

FIG. 4 illustrates a content promoter interface 155 that provides a mechanism to allow advertisers or promoters to view a list of video clips that may be good candidates for promoting. For example, a promoter may execute the video clip application 132 on a computing device 102 which can access the content promoter 166 (or other modules or functionalities of the video clip service 101) to deliver the information for the content promoter interface 155. In some examples, a particular promoter may log into the video clip service 101, and then be presented with the content promoter interface 155 that depicts relevant information for that promoter. In some examples, the video clip service 101 may automatically create video clips for that promoter which is dependent upon clip settings 184. For example, the promoter may specify the clip settings 184 such as a listing of keywords which the promoter would like to track on the social media platform 104 for clip creation. Also, the clip settings 184 may specify settings for the type of clips such as the desired length or other editing settings. Then, the video clip service 101 may automatically create the video clips 162 as specified by the clip settings 184, and store a list of the video clips 162 in its own section. Then, the advertiser may log into the video clip application 132 to access its list of video clips 162.

The content promoter interface 155 may include a clip identification section 182 that lists the video clips 162 created by the video clip service 101 that can be used to promote products or services. Also, for each created video clip 162, the clip identification section 182 may provide relevant data 185 such as social media data 186 (e.g., the social media volume associated with the video clip 162), and clip data 188 that identifies information about the video clip 162 such as the location, description of the event, and text that describe certain aspects of the event. Also, the content promoter interface 155 may include a clip editor 187 that permits the promoter to edit the video clips 162. The clip editor 187 may include any type of editing controls known to one of ordinary skill in the art.

Figure 5:
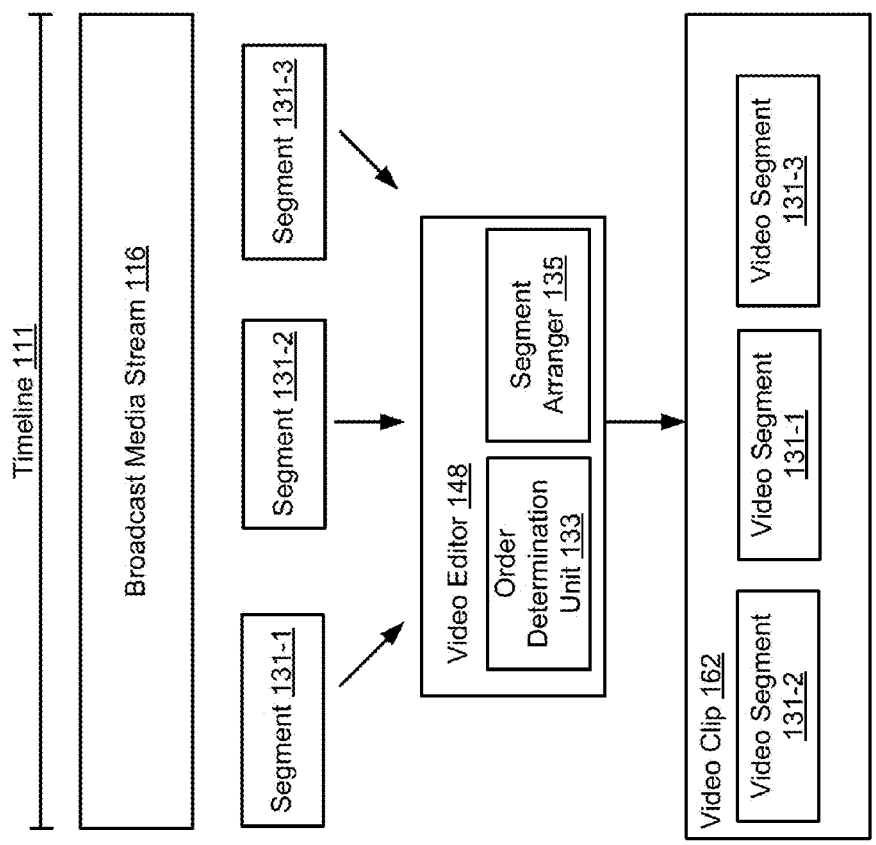
FIG. 5 illustrates a schematic diagram of the video editor that arranges a plurality of segments within a video clip according to an implementation.

FIG. 5 illustrates a schematic diagram of the video editor 148 arranging a plurality of segments 131 within a video clip 162 according to an embodiment. For example, the video editor 148 may determine a plurality of segments 131 from the broadcast media stream 116 as discussed above. The plurality of segments 131 may include a first segment 131-1, a second segment 131-2, and a third segment 131-3. With reference to FIG. 5, the use of three segments is for explanatory purposes only, where the embodiments encompass any number of segments (including any number of two or more). The first segment 131-1 may be a snippet of video towards the beginning of the broadcast media stream 116, the second segment 131-2 may be a snippet of video towards the middle of the broadcast media stream 116, and the third segment 131-3 may be a snippet of video towards the end of the broadcast media stream 116. The first segment 131-1, the second segment 131-2, and the third segment 131-3 may be distinct and separate segments. In some examples, the first segment 131-1, the second segment 131-2, and the third segment 131-3 may be separated from each other by a certain temporal distance.

The video editor 148 may include an order determination unit 133 configured to determine an order for the segments 131 and a segment arranger 135 configured to arrange the segments 131 according to the determined order. In some examples, the order determination unit 133 may determine the order as temporal, and the segment arranger 135 may arrange the segments 131 in temporal order (e.g., the first segment 131-1, the second segment 131-2, the third segment 131-3) in the video clip 162. In other examples, the order determination unit 133 may determine the order using the social media volume, and the segment arranger 135 may arrange the segments 131 according to increasing or decreasing social media volume in the video clip 162. For example, out of the three segments, the second segment 131-2 may have the highest social media volume, followed by the first segment 131-1, and then the third segment 131-3. In this case, the segment arranger 135 may arrange the segments of the video clip 162 as the second segment 131-2, the first segment 131-1, and then followed by the third segment 131-2.

Figure 6:
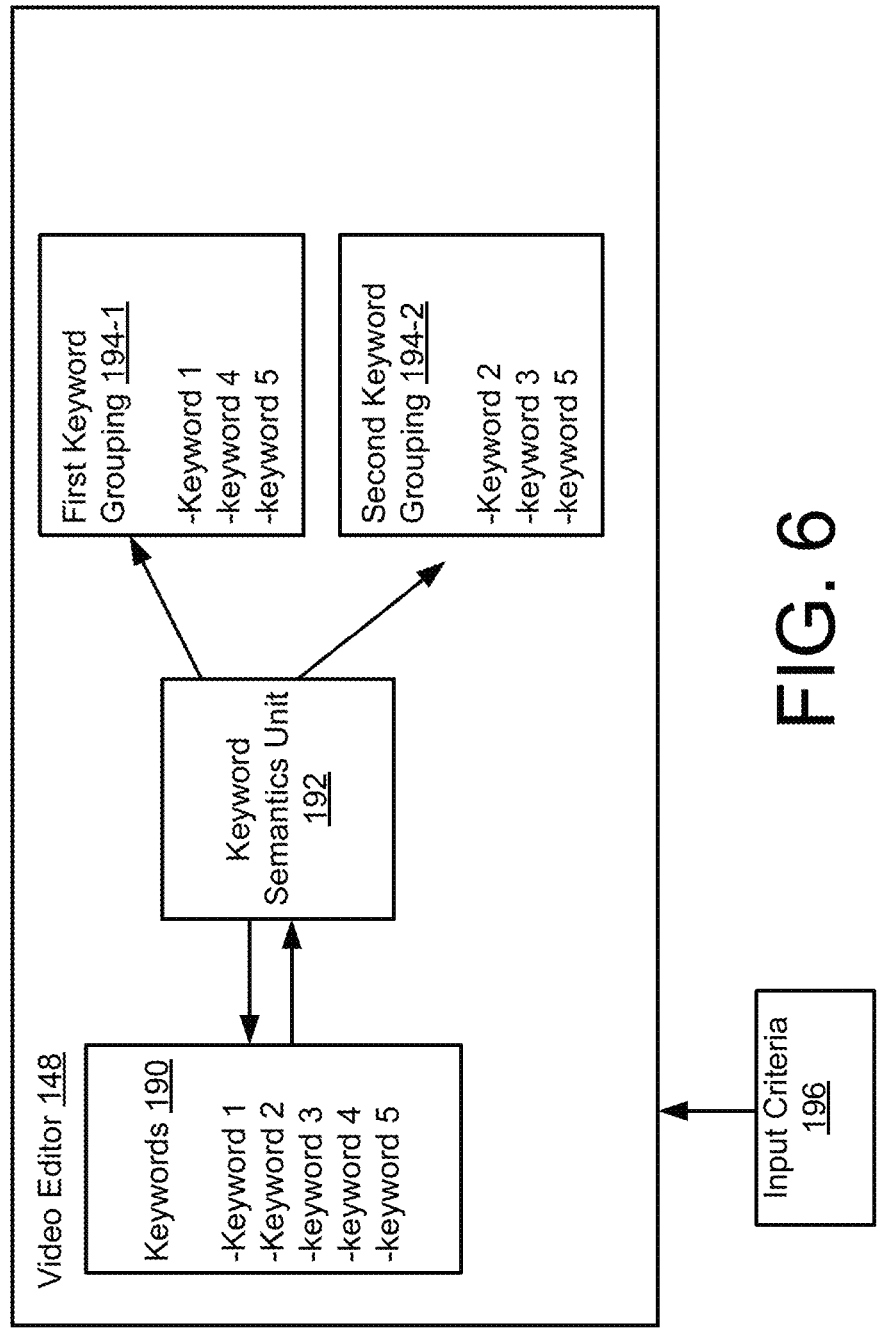
FIG. 6 illustrates a schematic diagram of the video editor having a keywords semantics unit for determining one or more keyword groupings according to an implementation.

FIG. 6 illustrates a schematic diagram of the video editor 148 having a keyword semantics unit 192 for determining one or more keyword groupings 194. For example, as indicated above, keywords 190 may be defined with the video clip service 101 for a particular media broadcast stream 116, and these keywords 190 are used to obtain social media volume. However, in some embodiments, the video editor 148 may include the keywords semantics unit 192 that automatically determines one or more keyword groupings 194 based on input criteria 196. For example, the input criteria 196 may specify that the user of the video clip service 101 wants to create a highlight reel for individual players during a basketball game. In this case, the keyword semantics unit 192 may automatically group the keywords 190 into different keywords groupings 194 such as a first keyword grouping 194-1 that corresponds to player A and a second keyword grouping 194-2 that corresponds to player B.

Figure 7:
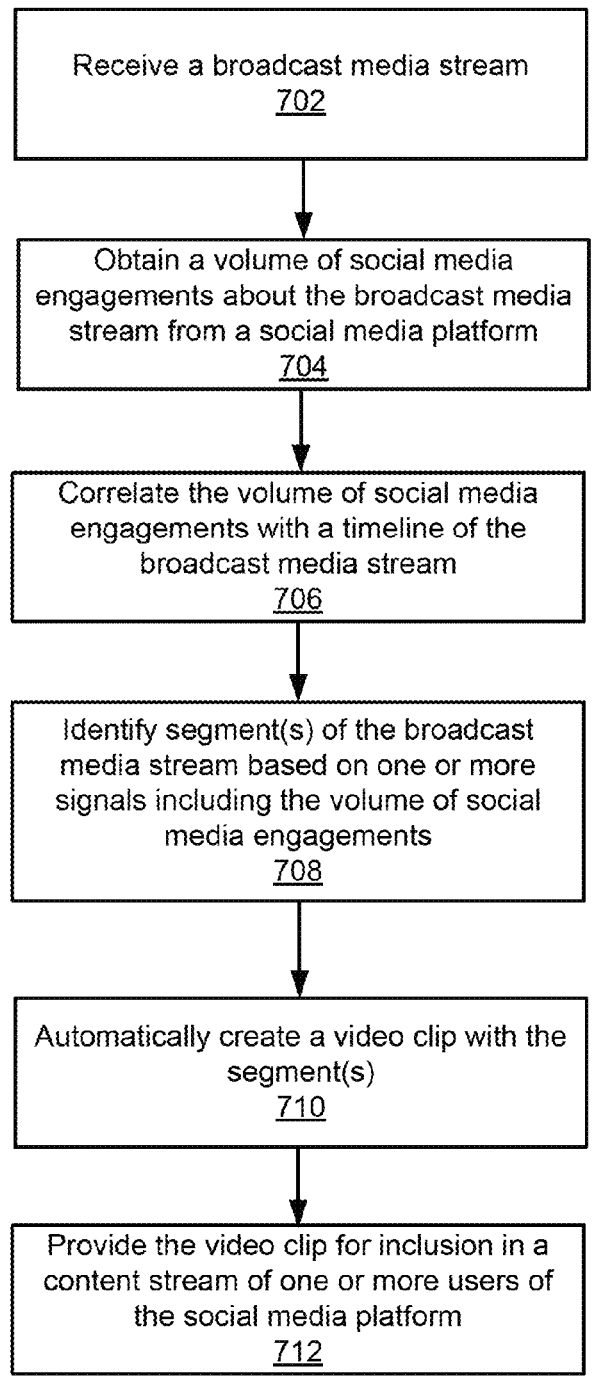
FIG. 7 is a flowchart depicting example operations of the system of FIG. 1 according to an implementation.

FIG. 7 illustrates a flow chart illustrating a method 700 depicting example operations of the video clip service 101.

A broadcast media stream may be received (702). For example, the video editor 148 may receive a broadcast media stream 116 from a video source 106. In some examples, the broadcast media stream 116 is a live broadcast.

A volume of social media engagements about the broadcast media stream may be obtained from a social media platform (704). For example, the video editor 148 may obtain a volume of social media engagements 112 about the broadcast media stream from the social media platform 104. In some examples, the volume of social media engagements 112 represent the amount of real-time or near real-time social media metrics that reflect the level of user engagement with the broadcast media stream 116 on the social media platform 104.

The volume of social media engagements may be correlated with a timeline of the broadcast media stream (706). The video editor 148 may include a correlator 152 configured to correlate the volume of the social media engagements 112 with the timeline 111 of the broadcast media stream 116.

One or more segments of the broadcast media stream may be identified based on one or more signals including the volume of social media engagements (708). For example, the video editor 148 (moment detector 154) may identify one or more segments of the broadcast media stream 116 based on one or more signals 103 including the volume of the social media engagements 112.

A video clip with the one or more segments may be automatically created (710). For example, the clip creator 156 may automatically create a video clip 162 with the one or more segments. In some examples, the clip creator 156 determines a starting point and an ending point in the broadcast media stream 116 using a combination of the signals 103.

The video clip may be provided for inclusion in a content stream of one or more users of the social media platform (712). For example, the clip surfacer 164 may be configured to provide the video clip 162 to one or more users of the social media platform 104. In some examples, the clip surfacer 164 may provide the video clip 162 to a user's social media stream on the social media platform 104. In some examples, the clip surfacer 164 may provide the video clip 162 to other tabs or interfaces of the social media platform 104 such as an area that provides trending data like messages, posts, videos, etc. In some examples, the clip surfacer 164 may provide the video clip 162 to the users or classes of users identified by the content targeting determination unit 158. In some examples, the clip surfacer 164 may provide the actual video clip 162 via a social media message or post sent to the identified users. In other examples, the clip surfacer 164 may provide a link to the video clip via a social media message or post sent to the identified users. In other examples, the clip surfacer 164 may identify or provide the video clip via other interfaces of the social media platform 104 that identifies trends or discoveries in a local, regional, national, or global level.

The clip surfacer 164 may provide the video clip 162 in conjunction with or in response to a message or post provided by a user. For example, the clip surfacer 164 may receive an indication from the social media analyzer 128 that a particular user of the social media platform 104 has shared a message that relates to the created video clip 162. The message may indicate certain information about the event captured by the video clip 162 (e.g., the message contains the same or similar keyword(s) that was used to pull the social media volume about the broadcast). As such, if the clip surfacer 164 recognizes that the user's message relates to the newly created video clip 162 beyond a threshold level of confidence, the clip surfacer 164 may suggest or provide that video clip 162 to that user. In some examples, the clip surfacer 164 may respond with a message suggesting the user view, post, and/or share this video clip 162.

Figure 8:
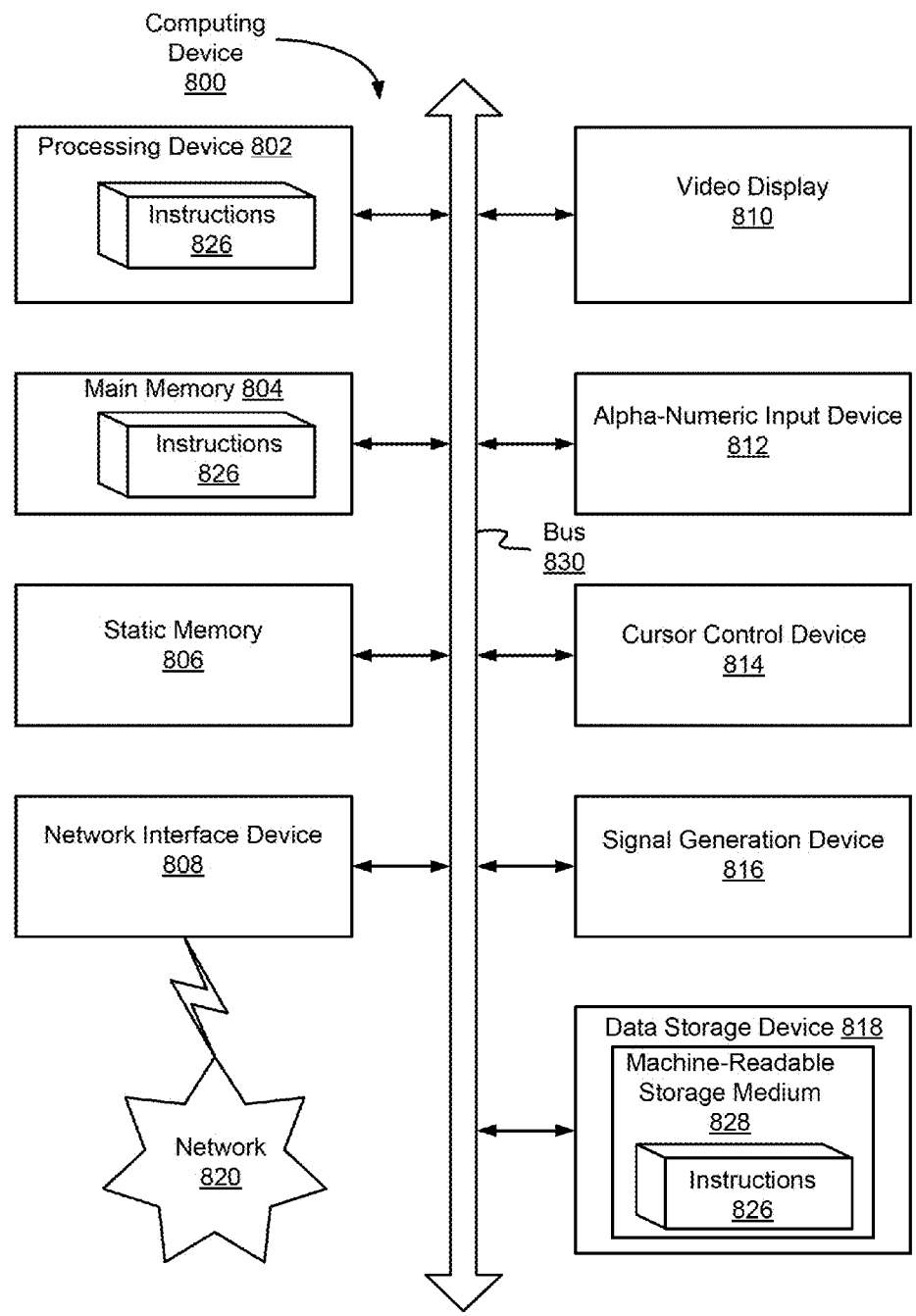
FIG. 8 shows an example of a computer device and a mobile computer device that can be used to implement the techniques described here.

FIG. 8 illustrates a diagrammatic representation of a machine in the example form of a computing device 800 within which a set of instructions, for causing the machine to perform any one or more of the methodologies discussed herein, may be executed. The computing device 800 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In some examples, the computing device 800 may implement system 100 of FIG. 1 (e.g., the video clip service 101). In one implementation, the computing device 800 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 (e.g., instructions for an application ranking system) for performing the operations and steps discussed herein.

The computing device 800 may further include a network interface device 1008 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In one implementation, the video display unit 810, the alphanumeric input device 812, and the cursor control device 814 may be combined into a single component or device (e.g., an LCD touch screen).

The data storage device 818 may include a computer-readable storage medium 1028 on which is stored one or more sets of instructions 826 (e.g., instructions for the application ranking system) embodying any one or more of the methodologies or functions described herein. The instructions 826 may also reside, completely or at least partially, within the main memory 804 and/or within the processing device 1002 during execution thereof by the computing device 800, the main memory 804 and the processing device 802 also constituting computer-readable media. The instructions may further be transmitted or received over a network 820 via the network interface device 808.

While the computer-readable storage medium 828 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
    a video clip service configured to execute on at least one server, the video clip service configured to create one or more video clips of broadcast media streams and distribute the one or more video clips in a social media network; and
    a video clip application configured to execute on a computing device, the video clip application configured to communicate with the video clip service over a network, the video clip application configured to provide a video clip editing interface,
    wherein the video clip service includes a video editor configured to receive a broadcast media stream and obtain a volume of social media engagements on the social media network using a set of keywords, the set of keywords including one or more user-defined keywords, the social media engagements being user engagements on the social media network about the broadcast media stream,
    wherein the video editor is configured to provide the broadcast media stream, a visualization of the changing volume of social media engagements against a timeline of the broadcast media stream, and a plurality of selectable keywords within the video clip editing interface of the video clip application,
    wherein the video editor is configured to identify a segment from the broadcast media stream in response to the segment's volume of social media engagements exceeding a threshold level, and create a video clip having at least the identified segment,
    wherein the video clip service includes a video surfacer configured to provide the video clip for inclusion in a content stream of one or more users of the social media network.

2. The system of claim 1, wherein the video surfacer is configured to transmit a social media message to one or more users on the social media network, the social media message including the video clip or a link to the video clip.

3. The system of claim 1, wherein the set of keywords includes a first group of keywords and a second group of keywords, the video editor configured to detect a first segment of the broadcast media stream based on volume of social media engagements corresponding to the first group of keywords and detect a second segment of the broadcast media stream based on volume of social media engagements corresponding to the second group of keywords, the video editor configured to create one or more video clips having the first segment and the second segment.

4. The system of claim 1, wherein the video editor is configured to obtain a plurality of segments from the broadcast media stream, each segment of the plurality of segments being a different portion of the broadcast media stream, the video editor configured to create the video clip by arranging the plurality of segments by temporal order or by each segment's volume of social media engagements.

5. The system of claim 1, wherein the visualization is a sound wave.

6. The system of claim 1, wherein the video clip service includes:
    a video analyzer configured to analyze a video component of the broadcast media stream,
    wherein the video editor is configured to map output of the video analyzer with the timeline of the broadcast media stream,
    wherein the video editor is configured to determine a start point and an end point of the segment based on the volume of social engagements and the output of the video analyzer.

7. The system of claim 6, wherein the video analyzer includes an object recognition unit configured to detect objects or persons in the video component and a scene detection unit configured to determine a change in scenes of the video component.

8. The system of claim 1, wherein the video clip service includes:
    an audio analyzer configured to analyze an audio component of the broadcast media stream, wherein the video editor is configured to map output of the audio analyzer with the timeline of the broadcast media stream, wherein the video editor is configured to determine a start point and an end point of the segment based on the volume of social engagements and the output of the audio analyzer.

9. The system of claim 8, wherein the audio analyzer includes a text-to-speech unit configured to convert speech of the audio component into text.

10. The system of claim 1, wherein the video clip service includes:

a content targeting determination unit configured to determine one or more users of the social media network as targets for the video clip, wherein the video surfacer is configured to provide the video clip to the determined targets.

11. The system of claim 10, wherein the video clip service includes:

a social media analyzer configured to determine whether a sentiment of the social media engagements about the broadcast media stream is favorable to a class of users among a plurality of classes, wherein the content targeting determination unit is configured to determine the targets for the video clip as the class of users having the favorable sentiment.

12. The system of claim 10, wherein the video clip service includes:

a social media analyzer configured to identify that a plurality of users are interested in a particular topic, and when the broadcast media stream relates to the particular topic, the content targeting determination unit is configured to determine the targets for the video clip as the plurality of users which are interested in the particular topic.

13. The system of claim 1, wherein the video surfacer is configured to determine that a social media message posted by a user on the social media network includes at least one keyword of the set of keywords used to create the video clip, and the video surfacer is configured to provide the video clip in the content stream of the user.

14. The system of claim 1, wherein the video editor is configured to provide a display of the broadcast media stream within the video clip editing interface proximate to the visualization of the social media engagements.

15. A non-transitory computer-readable storage medium comprising executable instructions that when executed by at least one computer processor are configured to:

receive, by a video clip service executing on at least one server, a broadcast media stream;

obtain, by the video clip service, a volume of social media engagements of a social media network using a set of keywords, the set of keywords including one or more user-defined keywords, the social media engagements being user engagements on the social media network about the broadcast media stream;

detect, by the video clip service, one or more segments of the broadcast media stream using one or more signals, the one or more signals including the volume of social media engagements mapped to a timeline of the broadcast media stream;

provide, by the video clip service, the broadcast media stream, a visualization of the changing volume of social media engagements against a timeline of the broadcast media stream, and a plurality of selectable keywords within a video clip editing interface of a video clip application;

automatically create, by the video clip service, a video clip with the one or more segments;

determine, by the video clip service, that a social media message posted by a user on the social media network includes at least one keyword of the set of keywords used to create the video clip; and provide, by the video clip service, the video clip for inclusion in a content stream of the user.

16. The non-transitory computer-readable storage medium of claim 15, wherein the one or more signals includes a plurality of signals, the plurality of signals including the volume of social media engagements, external data received from an external source, output of a video analyzer, output of an audio analyzer, and output from a social media analyzer, and the plurality of signals are inputted into a scoring algorithm that calculates a score for segments of the broadcast media stream.

17. The non-transitory computer-readable storage medium of claim 15, wherein the executable instructions includes instructions to:

provide a display of the broadcast media stream;

provide a visualization of the volume of the social media engagements against the timeline of the broadcast media stream; and insert an indicator on the timeline in response to the volume of social media engagements exceeding a threshold level.

18. A method for automatic clip creation, the method comprising:

receiving, by a video clip service executing on at least one server, a broadcast media stream from a video source;

obtaining, by the video clip service, a volume of social media engagements on of a social media network using a set of keywords, the set of keywords including one or more user-defined keywords, the social media engagements being user engagements on the social media network about the broadcast media stream;

providing, by the video clip service, the broadcast media stream, a visualization of the changing volume of social media engagements against a timeline of the broadcast media stream, and a plurality of selectable keywords within a video clip editing interface of a video clip application;

identify, by the video clip service, a segment the broadcast media stream in response to the segment's volume of social media engagements exceeding a threshold level;

automatically creating, by the video clip service, a video clip with at least the identified segment; and providing, by the video clip service, the video clip for inclusion in a content stream of one or more users of the social media network.

19. The method of claim 18, wherein the video clip is created in multiple different formats for distribution on multiple social media networks.

* * * * *